(12) United States Patent
Neuteboom

(10) Patent No.: US 6,275,010 B1
(45) Date of Patent: Aug. 14, 2001

(54) BATTERY CHARGER

(75) Inventor: Harry Neuteboom, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/639,150

(22) Filed: Aug. 16, 2000

(30) Foreign Application Priority Data

Aug. 25, 1999 (EP) .................................................. 99202751

(51) Int. Cl.$^7$ .................................................. H02J 7/00
(52) U.S. Cl. ............................................ 320/137; 320/164
(58) Field of Search .................................... 320/137, 140, 320/108, 127, 128, 162, 163, 164

(56) References Cited

U.S. PATENT DOCUMENTS 5,798,630 * 8/1998 Sugimori et al. ..................... 320/137
5,982,153 * 11/1999 Nagai et al. .......................... 320/164

FOREIGN PATENT DOCUMENTS

9414221A1    6/1994 (WO) .

* cited by examiner

*Primary Examiner*—Peter S. Wong
*Assistant Examiner*—Lawrence Luk
(74) *Attorney, Agent, or Firm*—Steven R. Biren

(57) ABSTRACT

A battery charger comprising a converter (CNV) for converting an input voltage ($U_i$) which is connected between an input terminal (1) and a reference terminal (GND) into a terminal voltage ($V_{k1}$) of a rechargeable battery (BT) which is connected between an output terminal (2) and the reference terminal (GND). The converter comprises a first and a second switch ($SW_1$, $SW_2$), a coil (L), a control circuit (CNTRL), a comparator (CMP), a frequency counter (CNT), and an indicator (IND). If the terminal voltage ($V_{k1}$) is lower than the reference voltage ($V_{RF}$), the start signal (ST) delivered by the comparator (CMP) will turn logic high. As a consequence the control circuit (CNTRL) will start an energy transfer cycle for transferring an amount of energy from the input terminal (1) to the rechargeable battery (BT). The frequency of the start signal (ST) decreases as the terminal voltage ($V_{k1}$) increases. By measuring the frequency of the start signal (ST) the indicator (IND) has the possibility of supplying a battery-high indication signal (BTHGH) when the rechargeable battery (BT) is almost full.

1 Claim, 2 Drawing Sheets

BATTERY CHARGER

BACKGROUND OF THE INVENTION

The invention relates to a battery charger comprising a converter for converting an input voltage between an input terminal and a reference terminal into a terminal voltage of a battery between an output terminal and the reference terminal, comprising switching means for controlling the value of the terminal voltage to the value of a reference voltage, a control circuit for controlling the switching means, comparison means for making a comparison of the terminal voltage with the reference voltage, and indication means for providing an indication signal when the battery is substantially fully charged.

Such a battery charger is known from international patent application WO 94/14221. A battery charger is described therein which comprises a self-oscillating flyback converter with inter alia a transformer, a bipolar switching transistor, and a control circuit. The control circuit blocks the bipolar switching transistor when the terminal voltage of the battery has risen above a reference voltage. When the pulse width of the voltage at the base of the bipolar switching transistor comes below a certain limit, an indicator lamp indicates that the battery has been (substantially) fully charged.

There is a demand for simple and reliable battery chargers for charging batteries of hearing aids, provided with indication means for indicating that the battery is substantially fully charged.

To meet this demand, the battery charger mentioned in the opening paragraph is characterized in that the converter comprises a coil with a first and a second terminal; and in that the switching means comprise a first switch of which a control electrode is coupled to the control circuit for receiving a first control signal and a second switch of which a control electrode is coupled to the control circuit for receiving a second control signal; and in that the first terminal of the coil is coupled to the input terminal; and in that the first switch is connected between the second terminal of the coil and the reference terminal; and in that the second switch is connected between the second terminal of the coil and the output terminal; and in that the comparison means provide a start signal to the control circuit in response to said comparison for initiating an energy transfer from the input terminal to the battery; and in that the battery charger comprises frequency detection means coupled for receiving the start signal and coupled to the indication means for providing the indication signal when the frequency of the start signal has exceeded a certain limit.

SUMMARY OF THE INVENTION

The invention is based inter alia on the recognition that the number of times per unit time an energy transfer is to take place from the first terminal of the converter to the load is dependent on the instantaneous terminal voltage of the battery.

Whenever an energy transfer is to take place, this is passed on by the comparison means to the control circuit of the converter by means of the start signal. The frequency of the start signal is thus directly proportional to the number of energy transfers per unit time. The frequency of the start signal is accordingly dependent on the terminal voltage of the battery and is thus also a measure for the condition of the battery (i.e. to what extent the battery has been charged). The frequency of the start signal is determined by the frequency detection means and passed on to the indication means. If the limit mentioned above was chosen such that it corresponds to an almost (but not completely) full battery, the indication signal will indicate at the correct moment that the battery is again ready for use. The indication signal may be, for example, a pulsatory bleep tone.

The converter is a so-called inductive converter, i.e. it has a coil which serves for storing energy originating from the first terminal of the converter and giving off the energy again to the battery. The use of the inductive converter means that the frequency of the start signal decreases as the battery becomes increasingly charged.

BRIEF DESCRIPTION OF THE DRAWING

The invention will be explained in more detail below with reference to the accompanying drawing, in which.

Identical components or elements have been given the same reference symbols in these Figures.

DESCRIPTION OF THE PREFERRED EMBODIMENT

Figure 1:
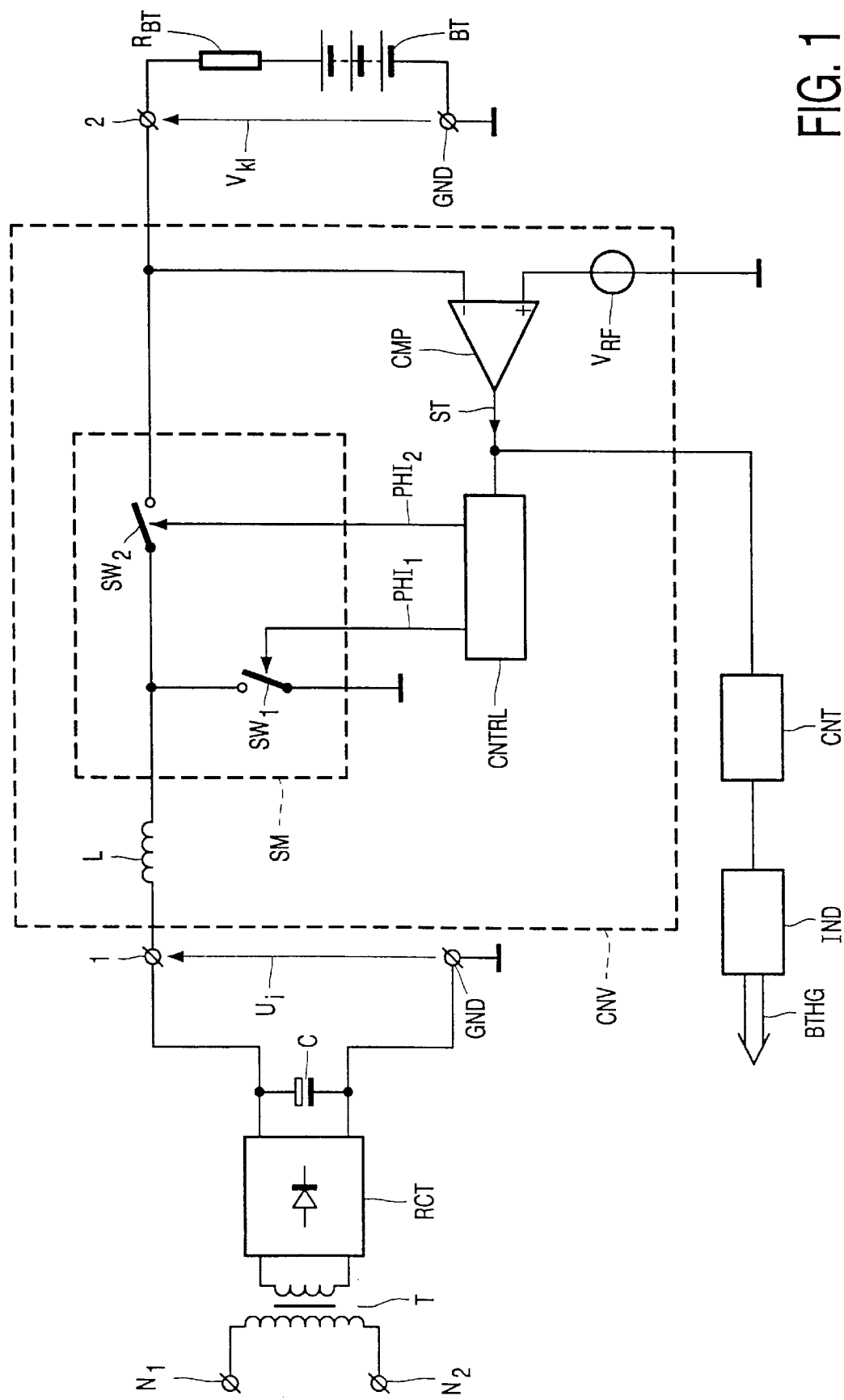
FIG. 1 is a circuit diagram of an embodiment of a battery charger according to the invention.

FIG. 1 is a circuit diagram of an embodiment of a battery charger according to the invention.

The battery charger comprises a transformer D, a rectifier element RCT, and a converter CNV. A primary coil of the transformer T is connected between terminals $N_1$ and $N_2$ between which a mains voltage, for example 230 V, can be connected. A secondary winding of the transformer T supplies a comparatively low AC voltage, for example 3 V, to the rectifier element RCT. The rectifier element RCT supplies a DC input voltage $U_i$ between an input terminal 1 and a reference terminal GND of the converter CNV. A smoothing capacitor C for smoothing the input voltage $U_i$ is connected between the input terminal 1 and the reference terminal GND.

The converter CNV comprises switching means SM which are implemented with a first switch $SW_1$ and a second switch $SW_2$. A battery BT with an internal resistance RBT is connected between an output terminal 2 and the reference terminal GND. The terminal voltage of the battery BT is referenced $V_{k1}$. The switches $SW_1$ and $SW_2$ are controlled from a control circuit CNTRL which supplies a first control signal $PHI_1$, and a second control signal $PHI_2$ to the control electrodes of the first switch $SW_1$ and the second switch $SW_2$, respectively. A coil L is connected by a first terminal to the input terminal 1 and is connected by a second terminal to a common junction point of the first switch $SW_1$, and the second switch $SW_2$. The first switch $SW_1$, is connected between the second terminal of the coil L and the reference terminal GND. The second switch $SW_2$ is connected between the second terminal of the coil L and the output terminal 2. The converter CNV is further provided with comparison means CMP which are constructed with a comparator CMP, frequency detection means CNT, which may be implemented, for example, with a frequency counter CNT, and indication means IND. When the frequency of the start signal ST has exceeded a certain limit, which certain limit is chosen such that it corresponds to an almost (but not fully) charged battery BT, it will be indicated at the correct moment that the battery BT is full by means of the indication signal BTLW supplied by the indicator IND. The indicator signal BTLW may be, for example, a pulsatory bleep tone or a warning lamp.

Figure 2:
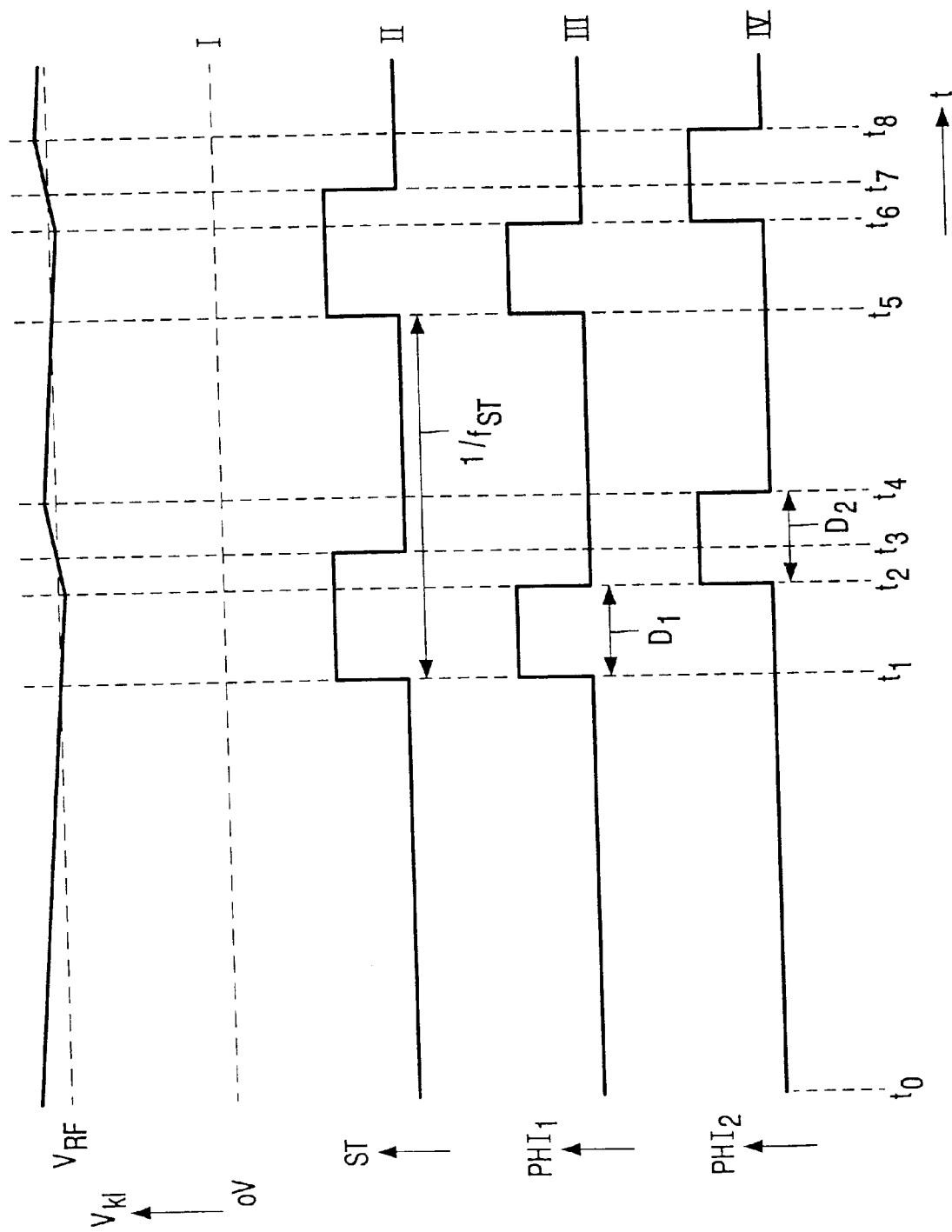
FIG. 2 contains a set of signal diagrams I–IV for a further clarification of the operation of the embodiment as shown in FIG. 1.

The operation of the embodiment of the battery charger of FIG. 1 will now be explained with reference to the set of signal diagrams I–IV shown in FIG. 2.

The terminal voltage $V_{k1}$ is higher than the reference voltage $V_{RF}$ during moment $t_0$ and moment $t_1$, so that the start signal ST has a logic low level. The first and the second control signal $PHI_1$, and $PHI_2$ are both logic low as a result of this, so that the first and the second switch $SW_1$, and $SW_2$ are both open (non-conducting). In other words, there is no energy transfer from the first terminal 1 to the battery BT between the moments $t_0$ and $t_1$. The terminal voltage $V_{k1}$ has fallen again to below the reference voltage $V_{RF}$ from moment $t_1$. This makes the start signal ST logic high, and an energy transfer circle is started by the control circuit CNTRL. The energy transfer cycle consists in that first the first control signal $PHI_{-1}$, becomes logic high during a period $D_1$ and immediately afterwards the second control signal $PHI_2$ becomes logic high during a period $D_2$. The first switch $SW_1$ is closed during the period $D_1$ and the second switch $SW_2$ is open. Energy is stored in the coil L as a result of this during the period $D_1$. During the period $D_2$, the first switch $SW_1$ is open and the second switch $SW_2$ is closed. As a result, the energy stored during the period $D_1$ is transferred to the battery BT in the period $D_2$. This causes the terminal voltage $V_{k1}$ to rise during the period $D_2$. This renders the terminal voltage $V_{k1}$ higher than the reference voltage $V_{RF}$ again at moment $t_3$ in this example. As a result of this, the start signal ST becomes logic low again, and the energy transfer cycle is ended thereby at moment $t_4$. In this example, the moment $t_3$ starting from which the terminal voltage $V_{k1}$ lies above the reference voltage $V_{RF}$ again occurs before the end of the (first) energy transfer cycle. If this is not the case, one or several energy transfer cycles will follow until the terminal voltage $V_{k1}$ has become greater than the reference voltage $V_{RF}$ again, whereupon no further energy transfer cycles will follow as long as the terminal voltage $V_{k1}$ remains higher than the reference voltage $V_{RF}$. In FIG. 2, the terminal voltage $V_{k1}$ is lower than the reference voltage $V_{RF}$ again starting from the moment $t_5$. The moments $t_5$–$t_8$ correspond to the moments $t_1$–$t_4$. The frequency $f_{ST}$ of the start signal ST is equal to the inverse of the cycle time of the start signal ST, which cycle time in FIG. 2 is equal to the time duration between moment ti and moment $t_5$. As the battery BT becomes more fully charged, the terminal voltage $V_{k1}$ will fall increasingly slowly at the moments when the switch $SW_2$ is open. This causes the start frequency $f_{ST}$ to fall.

The battery charger may be constructed both from discrete components and as part of an integrated circuit.

What is claimed is:

1. A battery charger comprising a converter (CNV) for converting an input voltage ($U_i$) between an input terminal (1) and a reference terminal (GND) into a terminal voltage ($V_{k1}$) of a battery (BT) between an output terminal (2) and the reference terminal (GND), comprising switching means (SM) for controlling the value of the terminal voltage ($V_{k1}$) to the value of a reference voltage (VRF), a control circuit (CNTRL) for controlling the switching means (SM), comparison means (CMP) for making a comparison of the terminal voltage ($V_{k1}$) with the reference voltage (VRF), and indication means (IND) for providing an indication signal (BTHGH) when the battery (BT) is substantially fully charged, characterized in that the converter (CNV) comprises a coil (L) with a first and a second terminal; and in that the switching means (SM) comprise a first switch ($SW_1$) of which a control electrode is coupled to the control circuit (CNTRL) for receiving a first control signal ($PHI_1$) and a second switch ($SW_2$) of which a control electrode is coupled to the control circuit (CNTRL) for receiving a second control signal ($PHI_2$); and in that the first terminal of the coil (L) is coupled to the input terminal (1); and in that the first switch ($SW_1$) is connected between the second terminal of the coil (L) and the reference terminal (GND); and in that the second switch ($SW_2$) is connected between the second terminal of the coil (L) and the output terminal (2); and in that the comparison means (CMP) provide a start signal (ST) to the control circuit (CNTRL) in response to said comparison for initiating an energy transfer from the input terminal (1) to the battery (BT); and in that the battery charger comprises frequency detection means (CNT) coupled for receiving the start signal (ST) and coupled to the indication means (IND) for providing the indication signal (BTHGH) when the frequency ($f_{ST}$) of the start signal (ST) has exceeded a certain limit.

* * * * *